US011889315B2

(12) United States Patent
Guo (10) Patent No.: US 11,889,315 B2
(45) Date of Patent: Jan. 30, 2024

(54) METHOD AND APPARATUS FOR ESTABLISHING CONNECTION WITH MESH NETWORKING, AND GATEWAY DEVICE

(71) Applicant: BEIJING XIAOMI MOBILE SOFTWARE CO., LTD., Beijing (CN)

(72) Inventor: Shaolong Guo, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 292 days.

(21) Appl. No.: 17/387,027

(22) Filed: Jul. 28, 2021

(65) Prior Publication Data
US 2022/0303778 A1 Sep. 22, 2022

(30) Foreign Application Priority Data

Mar. 17, 2021 (CN) .......................... 202110286334.X (51) Int. Cl.
*H04L 9/40* (2022.01)
*H04L 67/10* (2022.01)
(Continued)

(52) U.S. Cl.
CPC ........... *H04W 12/50* (2021.01); *H04W 12/06* (2013.01); *H04W 48/16* (2013.01); *H04W 88/16* (2013.01);
(Continued)

(58) Field of Classification Search
CPC ..... H04W 12/50; H04W 12/06; H04W 48/16; H04W 88/16
(Continued)

(56) References Cited

U.S. PATENT DOCUMENTS

| 11,265,702 B1* | 3/2022 | Paczkowski | H04W 12/02 |
| 2013/0136033 A1* | 5/2013 | Patil | H04W 84/18 |
| | | | 370/254 |

(Continued)

FOREIGN PATENT DOCUMENTS

| CA | 3028298 A1 * | 6/2019 | ............ H04W 48/10 |
| CN | 108601094 A | 9/2018 | |

(Continued)

OTHER PUBLICATIONS

European Patent Application No. 21188369.9 extended Search and Opinion dated Feb. 2, 2022, 10 pages.
(Continued)

*Primary Examiner* — Haresh N Patel
(74) *Attorney, Agent, or Firm* — COZEN O'CONNOR (57) ABSTRACT

The present disclosure provides a method and an apparatus for Mesh networking, and a gateway device. The method includes: monitoring a probe request frame on a target channel, wherein the probe request frame is automatically transmitted on the target channel by a gateway device to be connected in a state of no network configuration; in response to a monitored probe request frame indicating that the gateway device to be connected meets a networking condition and receiving a networking instruction, establishing a Wi-Fi Protected Setup (WPS) connection with the gateway device to be connected; and synchronizing networking configurations with the gateway device to be connected through the WPS connection, so that the gateway device to be connected is connected to the Mesh network based on the networking configurations.

16 Claims, 5 Drawing Sheets

(51) Int. Cl.
H04W 12/50 (2021.01)
H04W 12/06 (2021.01)
H04W 48/16 (2009.01)
H04W 88/16 (2009.01)
H04W 76/14 (2018.01)
H04W 84/18 (2009.01)
H04W 72/542 (2023.01)

(52) U.S. Cl.
CPC .......... *H04W 72/542* (2023.01); *H04W 76/14* (2018.02); *H04W 84/18* (2013.01)

(58) Field of Classification Search
USPC .......................................................... 726/2
See application file for complete search history.

(56) References Cited

U.S. PATENT DOCUMENTS

| | | | | |
|---|---|---|---|---|
| 2014/0003286 | A1* | 1/2014 | Estevez | H04W 48/02 370/254 |
| 2017/0374560 | A1* | 12/2017 | Judge | H04W 16/20 |
| 2018/0213580 | A1* | 7/2018 | Taskin | H04W 88/16 |
| 2019/0268177 | A1* | 8/2019 | Li | G06N 20/00 |
| 2019/0306702 | A1 | 10/2019 | Yoon | |

FOREIGN PATENT DOCUMENTS

| | | | | | |
|---|---|---|---|---|---|
| CN | 109413608 | A | * | 3/2019 | ............ H04W 48/10 |
| CN | 111885680 | A | | 11/2020 | |
| EP | 2901799 | B1 | * | 7/2017 | ......... H04L 67/1068 |
| TW | I713351 | B | * | 12/2020 | ............ H04W 48/10 |
| WO | WO-2013165200 | A1 | * | 11/2013 | ............ H04W 48/10 |

OTHER PUBLICATIONS

Chinese Patent Application No. 202110286334.X, Office Action dated Jul. 13, 2022, 4 pages.
Chinese Patent Application No. 202110286334.X, English translation of Office Action dated Jul. 13, 2022, 6 pages.

* cited by examiner

FIG. 1 monitoring a probe request frame on a target channel, wherein the probe request frame is automatically transmitted on the target channel by a gateway device to be connected in a state of no network configuration — 201 in response to a monitored probe request frame indicating that the gateway device to be connected meets a networking condition and receiving a networking instruction, establishing a WPS connection with the gateway device to be connected — 202 synchronizing networking configurations with the gateway device to be connected through the WPS connection, so that the gateway device to be connected is connected to the Mesh network based on the networking configurations — 203

METHOD AND APPARATUS FOR ESTABLISHING CONNECTION WITH MESH NETWORKING, AND GATEWAY DEVICE

RELATED APPLICATION

This application claims priority to Chinese Patent Application No. 202110286334.X filed on Mar. 17, 2021, the content of which is hereby incorporated by reference in its entirety into this disclosure.

TECHNICAL FIELD

The present disclosure relates to a field of wireless network, and more particularly to a method and an apparatus for Mesh networking, a gateway device and a storage medium.

BACKGROUND

Mesh network, also known as multi-hop network, is a type of networking mode in which a plurality of gateway devices with Mesh function are configured with a same service set identifier (SSID), so as to expand the coverage area of the wireless network. As compared to a conventional wireless relay network, Mesh network is a networking mode that has capabilities of self-networking, automatic configuration synchronization, and even guiding access of wireless terminals.

SUMMARY

According to a first aspect, a method for Mesh networking is provided. The method is applied to a gateway device connected to a Mesh network. The method includes: monitoring a probe request frame on a target channel, wherein the probe request frame is automatically transmitted on the target channel by a gateway device to be connected in a state of no network configuration; in response to a monitored probe request frame indicating that the gateway device to be connected meets a networking condition and receiving a networking instruction, establishing a Wi-Fi Protected Setup (WPS) connection with the gateway device to be connected; and synchronizing networking configurations to the gateway device to be connected through the WPS connection, so that the gateway device is connected to the Mesh network based on the networking configuration.

According to a second aspect, an apparatus for Mesh networking is provided. The apparatus is applied to a gateway device connected to a Mesh network. The apparatus includes a processor and a memory configured to store instructions executable by the processor. The processor is configured to implement the method described in the first aspect by executing the instructions stored in the memory.

According to a third aspect, a gateway device is provided. The gateway device includes a Wi-Fi component, a processor, a memory, a prompt component and a button. The Wi-Fi component is configured to transmit and receive probe request frames. The memory is configured to store instructions executable by the processor. The prompt component is configured to issue a networking prompt. The button is configured to receive a networking instruction from a user in response to the networking prompt. The processor is configured to: control the prompt component to issue the networking prompt in response to a received probe request frame indicating that a gateway device to be connected meets a networking condition; receive the networking instruction from the button; establish a Wi-Fi protected setup (WPS) connection with the gateway device to be connected in response to the networking instruction; and synchronize networking configurations to the gateway device to be connected through the WPS connection, so that the gateway device to be connected is connected to the Mesh network based on the networking configurations.

According to a fourth aspect, a computer-readable storage medium is provided. The computer-readable storage medium is stored thereon with at least one instruction, program, code set or instruction set, wherein the at least one instruction, program, code set or instruction set is configured to be loaded and executed by the processor to implement the method for Mesh networking provided in the first aspect.

BRIEF DESCRIPTION OF THE DRAWINGS

FIG. 7 is a block diagram illustrating an apparatus for Mesh networking provided by an exemplary embodiment of the present disclosure;

FIG. 8 is a block diagram illustrating a gateway device provided by an exemplary embodiment of the present disclosure.

DETAILED DESCRIPTION

In order to make the purpose, technical solutions, and advantages of the present disclosure clearer, the following will further describe embodiments of the present disclosure in detail with reference to the attached drawings.

In related art, when an unconfigured gateway device needs to be added to the Mesh network, the Mesh button on the unconfigured gateway and the configured gateway need to be triggered at the same time within a certain period of time (such as 2 minutes), and a connection is established through Wi-Fi protected setup (WPS) and the Mesh networking is completed.

However, with the method for Mesh networking in the related art, a user needs to trigger Mesh buttons of two gateway devices that have been connected to the network at the same time within a certain period of time, which is a cumbersome operation for the user and the networking efficiency is low.

A method and an apparatus for Mesh networking, and a gateway device are provided in embodiments of the present disclosure. The technical solutions are as follows.

To facilitate understanding, terms involved in embodiments of the present disclosure are described below.

Gateway device: Gateway device is also called inter-network connector and protocol converter. The gateway realizes network interconnection above the network layer, is a complex network interconnection device and is only used for the interconnection of two networks with different high-level protocols. The gateway can be used for both wide area network interconnection and local area network interconnection. The gateway is a computer system or device that serves as an important role of conversion, and is used between two systems with different communication protocols, data formats or languages, and even completely different system architectures. The gateway is a translator. Unlike the bridge that simply conveys information, the gateway repackages the received information to meet the needs of the target system. Common gateway devices include wireless routers.

Mesh network: Mesh network, also known as multi-hop network, is a kind of networking mode in which a plurality of gateway devices with Mesh function are configured with a same service set identifier (SSID), so as to expand the coverage area of the wireless network. As compared to a conventional wireless relay network, the Mesh network is a networking mode that has capabilities of self-networking, automatic configuration synchronization, and even guiding access of wireless terminals.

Received Signal Strength Indication (RSSI): RSSI is an optional part of the wireless transmission layer, which is used to determine the link quality and whether to increase the broadcast transmission strength. It is a positioning technology that measures the distance between the signal point and the receiving point based on the strength of the received signal, and then performs positioning calculation based on the corresponding data. For example, a positioning engine of a wireless communication technology under short distance and low speed uses this technology and algorithm. The indication of the average signal strength input by the receiver is obtained by the measuring circuit of the receiver. This measurement generally does not include antenna gain or transmission system loss.

Wi-Fi Protected Setup (WPS): WPS is a certification project implemented by the Wi-Fi Alliance, the main purpose of which is to simplify the security encryption configuration of wireless network. The WPS technology is used to assist users to automatically set the SSID and configure the highest level of security keys (WPA2 or WPA3).

The phrase "a plurality of" mentioned in this disclosure means two or more than two. "And/or" describes the association of the associated objects, indicating that there may be three types of relationships. For example, A and/or B means: A exists alone, A and B exist at the same time, and B exists alone. The character "/" generally indicates that the associated objects are in an "or" relationship.

In the related art, when a user needs to add a new unconfigured gateway device to the Mesh network, the Mesh buttons on the unconfigured gateway and the configured gateway need to be triggered at the same time in a short period of time, which is cumbersome for the user to operate and has low networking efficiency.

In embodiments of the present disclosure, based on the WPS connection used in the related art, the triggering process for networking is optimized. The user does not need to manually trigger the Mesh button of the gateway device to be connected, and the gateway device to be connected automatically transmits the networking request to the configured gateway device. Moreover, the user only needs to trigger any one of the configured gateway devices in the Mesh network once to complete the Mesh networking, which simplifies the networking operation and improves the success rate of the Mesh networking.

Figure 1:
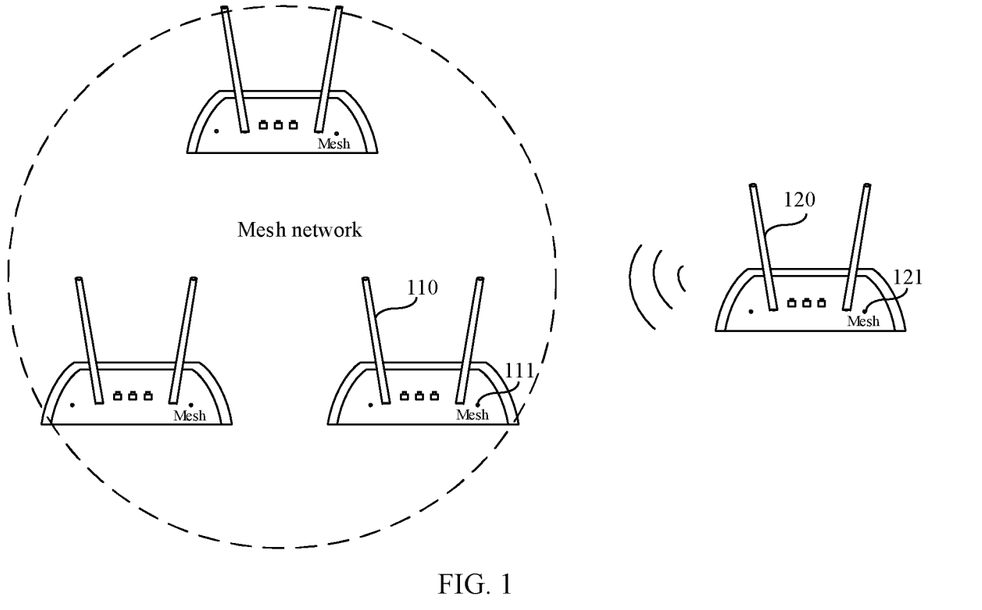
FIG. 1 is a schematic diagram illustrating an implementation environment provided by an exemplary embodiment of the present disclosure.

Referring to FIG. 1, which is a schematic diagram illustrating an implementation environment of the method for Mesh networking provided by an exemplary embodiment of the present disclosure. The implementation environment includes at least two connected gateway devices 110 and one gateway device 120 to be connected.

The connected gateway devices 110 form the Mesh network, and the connected gateway devices 110 have the same network configuration. The gateway device 120 to be connected is a new unconfigured gateway device that has not joined the Mesh network. The connected gateway devices 110 and the gateway device 120 to be connected may be Mesh routers with Mesh function. The Mesh router with the Mesh function is taken as an example in embodiments of the present disclosure.

As illustrated in FIG. 1, in a possible implementation, the Mesh network includes at least a plurality of connected gateway devices 110, in which at least one of the connected gateway devices 110 is provided with a Mesh button 111. When there is a need to add a new gateway device to the Mesh network to expand the network coverage, the Mesh button 111 may be triggered to perform Mesh networking.

Optionally, the connected gateway device 110 is also provided with an indicator light. When the connected gateway device 110 detects that there is an unconnected gateway device that meets the networking condition, the indicator light flashes or keeps on for prompt. When the user finds that the indicator light issues a networking prompt, Mesh networking may be performed by triggering the Mesh button 111. In addition, the networking prompt may be issued by setting a buzzer or speaker on the connected gateway device 110. The component that issues networking prompt is not limited in this embodiment.

The gateway device 120 to be connected is configured to establish a connection with the connected gateway device 110 and joins the Mesh network. When the gateway device 120 to be connected needs to perform networking, a probe request frame is transmitted to the connected gateway device 120 of the Mesh network. After the connected gateway device 110 monitors and confirms the probe request frame, a WPS connection is established with the gateway device 120 to be connected and Mesh networking is performed.

Optionally, the gateway device 120 to be connected is provided with an indicator light, which is configured to issue the networking prompt when the gateway device 120 to be connected monitors the probe request frame transmitted by other connected gateway devices (after the gateway device 120 to be connected is connected the Mesh network).

Optionally, the gateway device 120 to be connected is provided with a Mesh button 121, which is configured to receive a networking instruction manually triggered by the user and to perform Mesh networking with other gateway device to be connected (after the gateway device 120 to be connected is connected to the Mesh network).

In a possible application scenario, when the user needs to add the gateway device 120 to be connected to the established Mesh network to expand the coverage of the wireless network, the gateway device 120 to be connected automatically transmits a probe request frame to the outside. After the connected gateway device 110 in the Mesh network receives and identifies the probe request frame, it is determined that the gateway device 120 to be connected meets the networking condition, and a networking prompt is issued by flashing the set indicator light. The user triggers the Mesh button 111 of the connected gateway device 110 according to the indicator light to add the gateway device 120 to be connected into the Mesh network.

Figure 2:
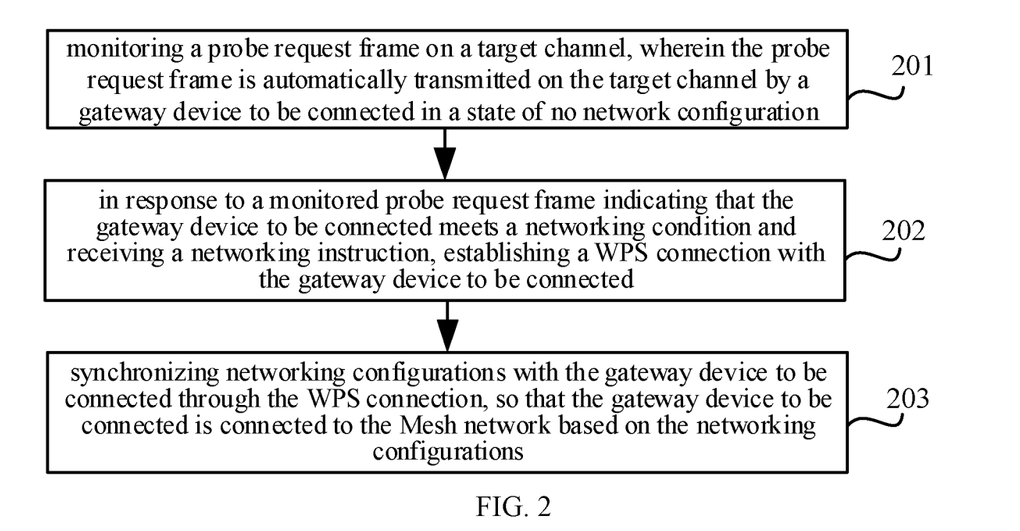
FIG. 2 is a flow chart illustrating a method for Mesh networking provided by an exemplary embodiment of the present disclosure.

FIG. 2 is a flow chart illustrating a method for Mesh networking provided by an exemplary embodiment of the present disclosure. In this embodiment, the method applied to the connected gateway device 110 illustrated in FIG. 1 is taken as an example for description. The method includes the followings.

In block 201, a probe request frame is monitored on a target channel, in which the probe request frame is automatically transmitted on the target channel by a gateway device to be connected in a state of no network configuration.

When a user needs to add a new gateway device to an existing Mesh network to expand the coverage of the wireless network, by powering on/initializing the unconfigured gateway device to be connected, the gateway device to be connected will enter the initial state and will automatically transmit the probe request frame to the surrounding.

Optionally, a button may be set on the gateway device to be connected. When the gateway device to be connected receives the button instruction, it transmits the probe request frame to the surrounding. When the user does not trigger the button, the gateway device to be connected does not automatically transmit the probe request frame, to save power consumption.

Optionally, the frequency of transmitting the probe request frame may be controlled by setting a timer for the gateway device to be connected. When the time for the gateway device to be connected to transmit the probe request frame reaches the preset duration and the networking is not successful, it is determined that there is no gateway device around that can be used to access the Mesh network, and the transmission of the probe request frame is stopped, and transmission is performed again when the interval time reaches the set duration.

When the connected gateway device in the Mesh network is in a normal working state, it will periodically monitor the probe request frame on each channel. The probe request frame is automatically transmitted on any target channel (such as 2.4G or 5G channel) by the gateway device to be connected. When the gateway device to be connected transmits the probe request frame on the target channel, and the connected gateway device is within the radiation range of the probe request frame, then the connected gateway device will receive the probe request frame on the same target channel (2.4G or 5G channel).

In block 202, in response to a monitored probe request frame indicating that the gateway device to be connected meets a networking condition and receiving a networking instruction, a WPS connection is established with the gateway device to be connected.

After the connected gateway device monitors the probe request frame transmitted by the gateway device to be connected on the target channel, it needs to determine whether the gateway device to be connected meets the networking condition according to the probe request frame. When the networking condition is not met, no connection will be established.

In order to determine whether the gateway device to be connected meets the networking condition, the connected gateway device may confirm according to the signal strength of the monitored probe request frame and the device identification information included in the probe request frame, for example, obtain the device identification information, including the media access control address (MAC), the serial number and the like of the gateway device to be connected, included in the probe request frame, and determine whether the gateway device to be connected meets the networking condition based on the obtained device identification information.

When the connected gateway device confirms that the gateway device to be connected meets the networking condition, corresponding networking prompt will be issued, in which the networking prompt is configured to prompt the user that a new gateway device that can perform Mesh networking is found. The user triggers the networking instruction based on the networking prompt issued by the connected gateway device. The networking instruction may be triggered by a key, a remote, or a voice.

In response to receiving the networking instruction by the connected gateway device, a connection is established with the gateway device to be connected through WPS interaction.

Optionally, the networking instruction may also be a program setting. After the connected gateway device confirms that the gateway device to be connected meets the networking condition, the connection with the gateway device to be connected will be directly established through the WPS interaction.

There is a plurality of data frame interactions in the process of WPS interaction between the connected gateway device and the gateway device to be connected, including exchanging information such as authentication method, encryption method, pre-shared key and the like used by both parties. After the interaction, the information such as the authentication method, encryption method, pre-shared key and the like will be unified.

In block 203, networking configuration are synchronized to the gateway device to be connected through the WPS connection, so that the gateway device to be connected is connected to the Mesh network based on the networking configurations.

When the connected gateway device establishes the WPS connection with the gateway device to be connected, the networking configurations of the Mesh network will be transmitted to the gateway device to be connected, including the SSID name and the SSID password of the Mesh network, the MAC address of the connected gateway device, Wi-Fi transmission channel, transmission power and other information. When the interaction between the connected gateway device and the gateway device to be connected is completed, the connection between the gateway device to be connected and the connected gateway device will be temporarily cut off.

After the gateway device to be connected obtains the networking configurations transmitted by the connected gateway device, it synchronizes its own networking configuration information based on the networking configurations. After synchronization, the gateway device to be connected will be connected with the connected gateway device again to join the Mesh Network.

In summary, according to the method for Mesh networking provided by embodiments of the present disclosure, the connected gateway device monitors the probe request frame transmitted by the gateway device to be connected on the target channel, confirms that the gateway device to be connected meets the networking condition based on the received probe request frame of the gateway device to be connected, and then establishes the WPS connection with the gateway device to be connected based on a received networking instruction, and synchronizes networking configurations to the gateway device to be connected through the established WPS connection, so that the gateway device to be connected joins the Mesh network. With the method for Mesh networking provided in embodiments of the present disclosure, there is no need to manually trigger the gateway device to be connected, which simplifies networking operation and improves the success rate of Mesh networking.

Figure 3:
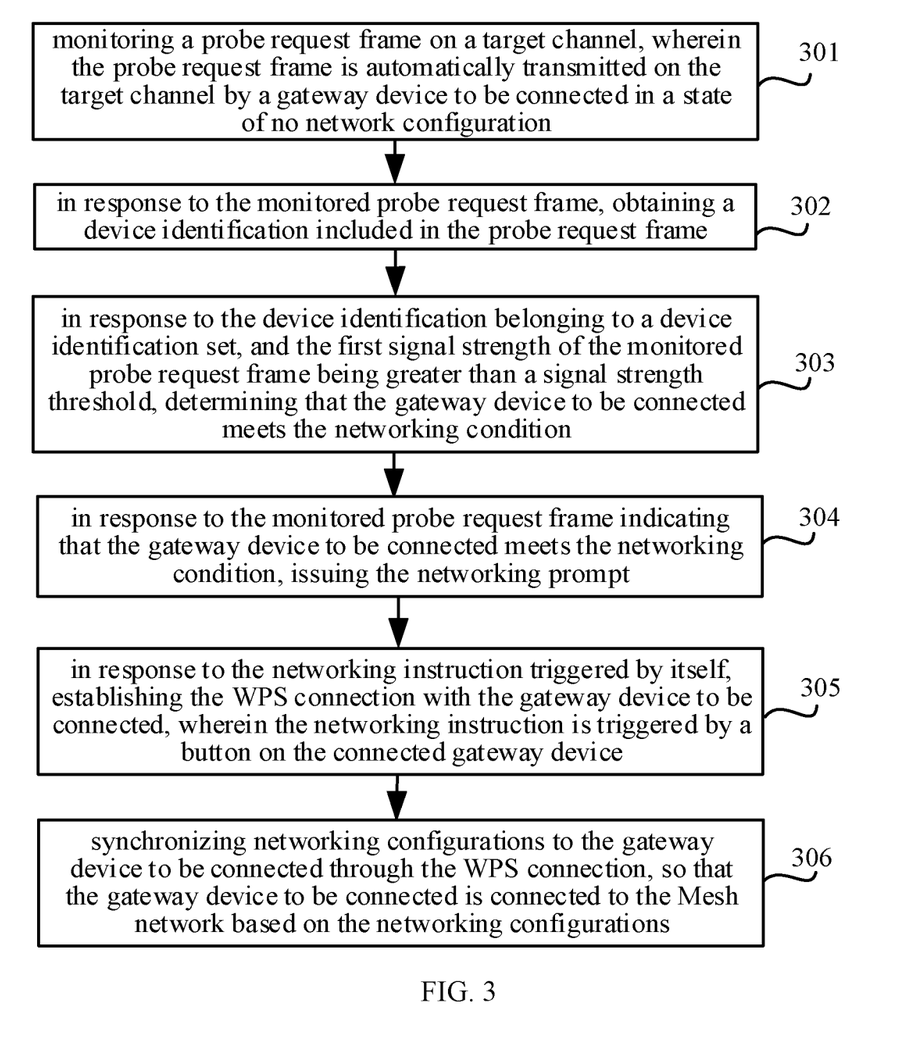
FIG. 3 is a flow chart illustrating a method for Mesh networking provided by another exemplary embodiment of the present disclosure.

FIG. 3 is a flow chart illustrating a method for Mesh networking provided by an exemplary embodiment of the present disclosure. The method is applied to a connected gateway device in the Mesh network, and includes the following blocks.

In block 301, a probe request frame is monitored on a target channel, in which the probe request frame is automatically transmitted on the target channel by a gateway device to be connected in a state of no network configuration.

For the implementation of this block, reference may be made to block 201, which is not elaborated in this embodiment.

In block 302, in response to the monitored probe request frame, a device identification included in the probe request frame is obtained.

After the connected gateway device receives the probe request frame transmitted by the gateway device to be connected, it needs to determine whether the gateway device to be connected is a valid gateway device, that is, whether the gateway device to be connected has the Mesh networking function. In the real world, there are many brands and types of gateway devices, and the probe request frame used for networking does not belong to the standard specification. Therefore, gateway devices of different types or brands may not be able to perform Mesh networking. Moreover, using different brands or types of gateway devices to establish networking may affect the quality of the entire Mesh network. Therefore, it is necessary to obtain the device identification included in the probe request frame to determine the validity of the gateway device to be connected.

In a possible implementation, after the connected gateway device monitors the probe request frame, the device identification of the gateway device to be connected included in the probe request frame is obtained, in which the device identification may be the identification information written by the manufacturer of the gateway device, such as the serial number or manufacturer information that can be identified by the connected gateway device.

In block 303, in response to the device identification belonging to the device identification set, and a first signal strength of the monitored probe request frame being greater than a signal strength threshold, it is determined that the gateway device to be connected meets the networking condition.

After the connected gateway device obtains the device identification, the device identification and the device identification set are matched. When the same device identification is found in the device identification set, the gateway device to be connected is confirmed as a valid gateway device with Mesh networking function.

In a possible implementation, the connected gateway device obtains the serial number of the gateway to be connected. When it is recognized that the field of the serial number of the gateway to be connected is within the range of fields permitted by the connected gateway, the gateway device to be connected is confirmed as a valid device.

For example, the serial numbers that can be identified by the connected gateway device are shown in Table 1.

TABLE 1

| Fields | Serial numbers |
| --- | --- |
| Field 1 | 7402-1259-1125-0000 |
| Field 2 | 7402-1259-1125-1000 |

It can be seen from Table 1 that the connected gateway device can identify all the serial numbers between field 1 and field 2. When the obtained serial number of the gateway device to be connected is between field 1 and field 2, the gateway device to be connected is confirmed as a valid gateway device, that is, the gateway device to be connected has the Mesh networking function. When the obtained serial number is not between field 1 and field 2, that is, the same device identification cannot be found, the gateway device is confirmed as not being able to perform Mesh networking.

Further, the connected gateway device determines the first signal strength of the probe request frame based on the monitored probe request frame. Generally, the signal strength of the probe request frame received by the connected gateway device is negatively correlated with the distance of the connected gateway device to be connected, that is, the closer the distance between the connected gateway device and the gateway device to be connected is, the stronger the signal strength of the received probe request frame is; the longer the distance is, the weaker the received signal strength is. In addition, the received signal strength may also be used to determine the link quality and whether it is necessary to increase the transmission strength of the Wi-Fi broadcast.

Generally, the distance between the connected gateway device and the gateway device to be connected for Mesh networking is relatively short. When the distance is far, the connected gateway device may receive the probe request frame transmitted by the gateway device which does not expect networking, but the signal strength of the monitored probe request frame is weak. Therefore, by setting the signal strength threshold, the gateway device which does not expect networking may be excluded.

In a possible implementation, when the connected gateway device detects that the first signal strength of the probe request frame is less than the signal strength threshold, it indicates that the gateway device to be connected may be far away from the connected gateway device, and the connected gateway device may receive the probe request frame transmitted by a gateway device which does not expect networking (for example, when networking is performed on one's own gateway device, a probe request frame transmitted by a neighboring gateway device is received), at this time, the connection to the gateway device which does not expect networking will affect network security. In this embodiment, setting the signal strength threshold can effectively reduce the possibility of connecting the gateway device which does not expect networking to the Mesh network, and improve networking accuracy and security.

When the first signal strength of the monitored probe request frame is greater than the signal strength threshold, for example, the signal strength threshold is set to −60 dBm, and the first signal strength of the monitored probe request frame is −50 dBm, that is, the first signal strength is greater than the signal strength threshold, it is determined that the distance between the gateway device to be connected that transmits the probe request frame is closer to the connected gateway device, indicating that the gateway to be connected is a new gateway device added by the user for networking, and whether the gateway device to be connected meets the condition of Mesh networking is determined.

In block 304, in response to the monitored probe request frame indicating that the gateway device to be connected meets the networking condition, a networking prompt is issued.

After the connected gateway device determines that the gateway device to be connected meets the Mesh networking condition, the indicator light of its own flashes or keeps on to issue a networking prompt to the user. When the user finds that the indicator light of the connected gateway device flashes or keeps on, the user confirms that the gateway to be connected finds that it can perform Mesh networking.

Optionally, the networking prompt may also be issued by providing at least one of a buzzer, a speaker, a vibration sensor, and a display on the connected gateway device, which is not limited in embodiments of the present disclosure.

In block 305, in response to receiving the networking instruction triggered by itself, the WPS connection with the gateway device to be connected is established, in which the networking instruction is triggered by a button provided on the connected gateway device to establish a WPS connection.

When the user finds at least one networking prompt of the indicator light prompt, beep prompt, voice prompt, vibration prompt, and image prompt of the connected gateway device, the user confirms the presence of the gateway device to be connected for the Mesh networking and clicks the Mesh button on the connected gateway device.

In response to the connected gateway device receiving the networking instruction triggered by the Mesh button, a WPS connection is established with the gateway device to be connected.

There is a plurality of data frame interactions in the process of WPS interaction between the connected gateway device and the gateway device to be connected, including exchanging the information such as the authentication method, encryption method, pre-shared key and the like used by both parties. After the interaction, the information such as the authentication method, encryption method, pre-shared key and the like will be unified.

In block 306, networking configurations are synchronized to the gateway device to be connected through the WPS connection, so that the gateway device to be connected is connected to the Mesh network based on the networking configurations.

For the implementation of this block, reference may be made to block 203, which is not elaborated in this embodiment.

In embodiments of the present disclosure, when the Mesh networking is required, the gateway device to be connected automatically transmits a probe request frame to the connected gateway device, and the connected gateway device confirms that the gateway device to be connected has the Mesh networking function based on the device identification included in the monitored probe request frame. Furthermore, based on the first signal strength of the monitored probe request frame being greater than the set threshold value, the connected gateway device determines that the gateway device to be connected meets the networking condition, and issues the networking prompt, thereby reducing the possibility of connecting the gateway device which does not expect networking to the Mesh network and improving the networking accuracy and security.

Moreover, the user confirms in time that the gateway device to be connected meets the networking condition based on the networking prompt issued by the connected gateway device, and then the connected gateway device performs the WPS connection with the gateway device to be connected based on the received networking instruction and synchronizes the networking configurations to complete the Mesh networking. During the networking process, the user only needs to trigger the Mesh button once according to the networking prompt to add the gateway device to be connected to the Mesh network, which simplifies the networking operation.

In a possible implementation, there may be a distant connected gateway device in the Mesh network that cannot monitor the probe request frame, and thus cannot issue the networking prompt, which may cause the user unable to confirm in time that the gateway device to be connected can perform networking. In order to ensure that the user can find and trigger the networking of the connected gateway device and the gateway device to be connected in time, when the connected gateway device in the Mesh network confirms that the gateway device to be connected meets the networking condition, all other connected gateway devices in the Mesh network are notified to issue the networking prompt.

In addition, when the selected connected gateway device is far away from the gateway device to be connected or the signal strength of the monitored probe request frame is weak, the network quality after networking may be poor, or even the gateway device to be connected after networking may be disconnected. In order to improve the network quality and networking success rate as much as possible, when the user triggers the Mesh button of the connected gateway device, the connected gateway device with the highest signal strength is selected to monitor the probe request frame and perform the networking with the gateway device to be connected, improving the network quality of the Mesh network.

Figure 4:
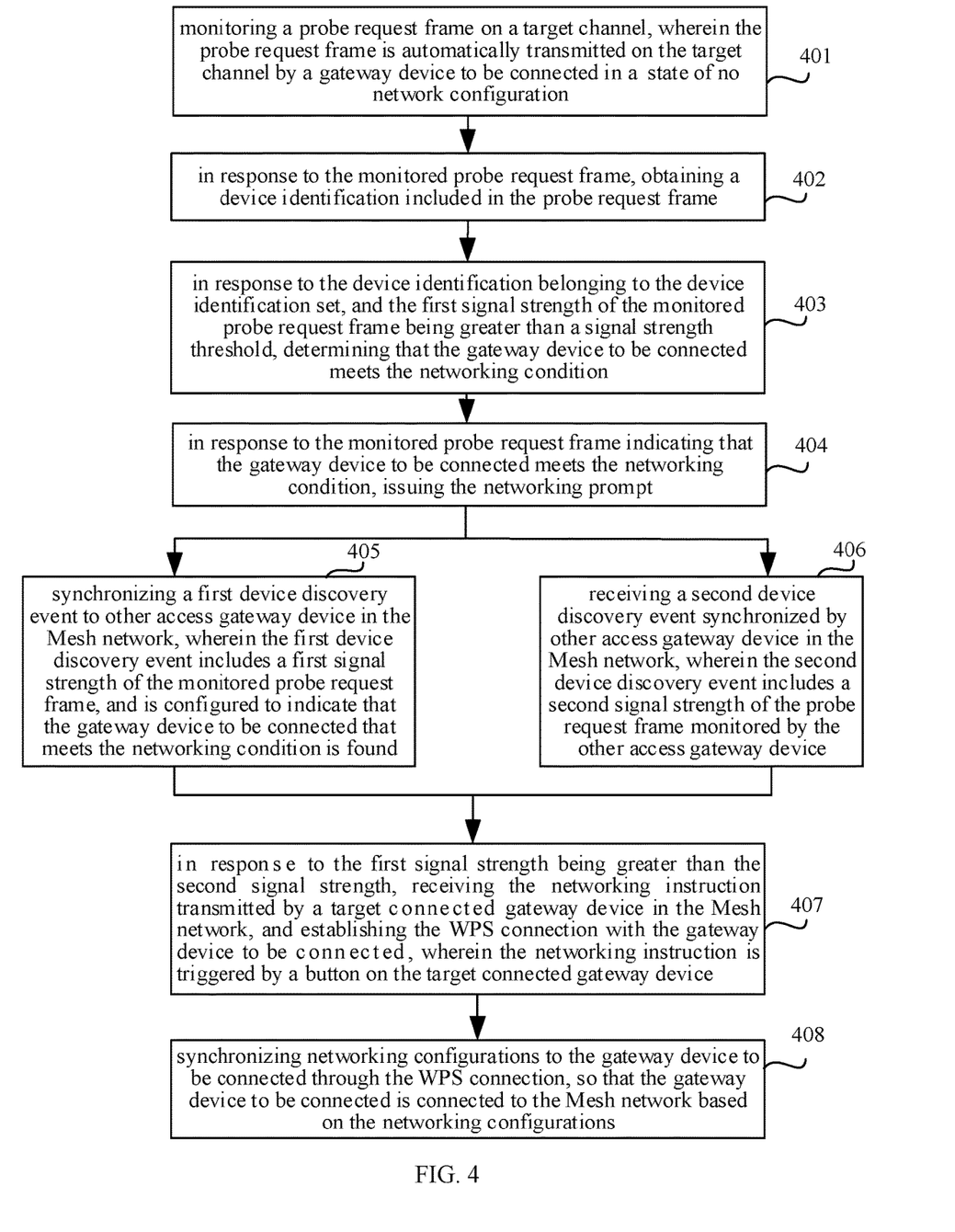
FIG. 4 is a flow chart illustrating a method for Mesh networking provided by another exemplary embodiment of the present disclosure.

FIG. 4 is a flow chart illustrating a method for Mesh networking provided by an exemplary embodiment of the present disclosure. The method is applied to a connected gateway device in the Mesh network, and includes the following blocks.

In block 401, a probe request frame is monitored on a target channel, in which the probe request frame is automatically transmitted on the target channel by a gateway device to be connected in a state of no network configuration.

For the implementation of this block, reference may be made to block 201, which is not elaborated in this embodiment.

In block 402, in response to the monitored probe request frame, a device identification included in the probe request frame is obtained.

For the implementation of this block, reference may be made to block 302, which is not elaborated in this embodiment.

In block 403, in response to the device identification belonging to the device identification set, and the first signal strength of the monitored probe request frame being greater than a signal strength threshold, it is determined that the gateway device to be connected meets the networking condition.

For the implementation of this block, reference may be made to block 303, which is not elaborated in this embodiment.

In block 404, in response to the monitored probe request frame indicating that the gateway device to be connected meets the networking condition, a networking prompt is issued.

For the implementation of this block, reference may be made to block 304, which is not elaborated in this embodiment.

In block 405, a first device discovery event is synchronized to other connected gateway device in the Mesh network, in which the first device discovery event includes the first signal strength of the monitored probe request frame, and is configured to indicate that the gateway device to be connected that meets the networking condition is found.

When the connected gateway device confirms that the gateway device to be connected meets the networking condition, the networking prompt will be issued through its own indicator light or other components, and at the same time the first device discovery event will be synchronized to other connected gateway device in the Mesh network, in which the first device discovery event is configured to indicate that the gateway device to be connected that meets the networking condition is found. The other connected gateway device is a connected gateway device in the Mesh network rather than the current connected gateway device.

Optionally, the first device discovery event includes the first signal strength of the probe request frame monitored by the connected gateway device and the MAC address of the gateway device to be connected, so that the connected gateway device monitoring the probe request frame can perform networking with the gateway device to be connected based on the first signal strength and the MAC address.

Further, when the connected gateway devices that have and have not monitored the probe request frame in the Mesh network receive the first device discovery event, the first signal strength and the MAC address of the gateway device to be connected are obtained, and networking prompts are issued by the indicator light or other component.

In block 406, a second device discovery event synchronized by other connected gateway device in the Mesh network is received, in which the second device discovery event includes a second signal strength of the probe request frame monitored by the other connected gateway device.

When the connected gateway device synchronizes the first device discovery event to other connected gateway device in the Mesh network, the connected gateway device will also receive the second device discovery event synchronized by the other connected gateway device in the Mesh network, in which the second device discovery event is transmitted by the connected gateway device that can monitor the probe request frame in the Mesh network. The second device discovery event includes the second signal strength of the probe request frame monitored by the other connected gateway device and the MAC address of the gateway device to be connected.

It is to be noted that, in this embodiment, the sequence of the first device discovery event synchronized by the connected gateway device and the second device discovery event synchronized by other connected gateway devices is not strictly limited.

In block 407, in response to the first signal strength being greater than the second signal strength, and receiving the networking instruction transmitted by the target connected gateway device in the Mesh network, the WPS connection with the gateway device to be connected is established, in which the networking instruction is triggered by a button provided on the target connected gateway device.

After receiving the second device discovery event synchronized by the other connected gateway device, the connected gateway device obtains the second signal strength included in the second device discovery event, and compares the second signal strength with the first signal strength it has obtained.

When the user finds that the target connected gateway device in the Mesh network issues the networking prompt, the user triggers the Mesh button on the target connected gateway device. When the connected gateway device receives the networking instruction, it transmits the networking instruction to all other connected gateway devices in the Mesh network, in which the target connected gateway device is the connected gateway device in the Mesh network except the current connected gateway device, and has received the networking instruction triggered by the user.

In response to receiving the networking instruction transmitted by the target connected gateway device, and the first signal strength being greater than the second signal strength, that is, determining that the connected gateway device is the connected gateway device with the highest signal strength that monitors the probe request frame in the Mesh network, the WPS connection is established with the gateway device to be connected.

For example, the Mesh network includes a connected gateway device A, a connected gateway device B, and a connected gateway device C, and a gateway device D to be connected, which is a new gateway device that needs to perform Mesh networking. The connected gateway device A and the connected gateway device B monitor the probe request frame transmitted by the gateway device D to be connected, and the connected gateway device C does not monitor the probe request frame.

In response to the connected gateway device A determining that the gateway device D to be connected meets the networking condition, the connected gateway device A synchronizes the first device discovery event to the connected gateway device B and the connected gateway device C, in which the first device discovery event includes the MAC address of the gateway device to be connected and the first signal strength of the probe request frame monitored by itself.

When the connected gateway device B determines that the gateway device D to be connected meets the networking condition, the connected gateway device B will also synchronize the second device discovery event to the connected gateway device A, in which the second device discovery event includes the MAC address of the gateway device D to be connected and the second signal strength of the probe request frame monitored by itself.

After the connected gateway device B receives the networking instruction (triggered by the user triggering the Mesh button on the connected gateway device B), the connected gateway device B synchronizes the networking instruction to the connected gateway device A and the connected gateway device C. At the same time, the connected gateway device B compares the second signal strength monitored by itself with the first signal strength monitored by the connected gateway device A.

After the connected gateway device A receives the networking instruction synchronized by the connected gateway device B, the connected gateway device A compares the first signal strength monitored by itself with the second signal strength monitored by the connected gateway device B, and in response to the first signal strength being greater than the second signal strength, establishes a WPS connection with the gateway device D to be connected.

In block 408, networking configurations are synchronized to the gateway device to be connected through the WPS connection, so that the gateway device to be connected is connected to the Mesh network based on the networking configurations.

For the implementation of this block, reference may be made to block 203, which is not elaborated in this embodiment.

In this embodiment, when the connected gateway device confirms that the gateway device to be connected meets the networking condition, the first device discovery event is synchronized to other gateway devices in the Mesh network to ensure that other connected gateway devices that cannot monitor the probe request frame can confirm that the gateway device to be connected meets the networking condition, and the networking prompt is issued so that the user can find it in time.

In addition, based on receiving the second device discovery event transmitted by the other gateway device, the second signal strength is obtained, and then the connected gateway device with the highest signal strength for monitoring the probe request frame is confirmed, and based on receiving the networking instruction transmitted by the target connected gateway device, the Mesh networking with the gateway device to be connected is performed, which improves the success rate of networking and the network quality of the Mesh network.

Figure 5:
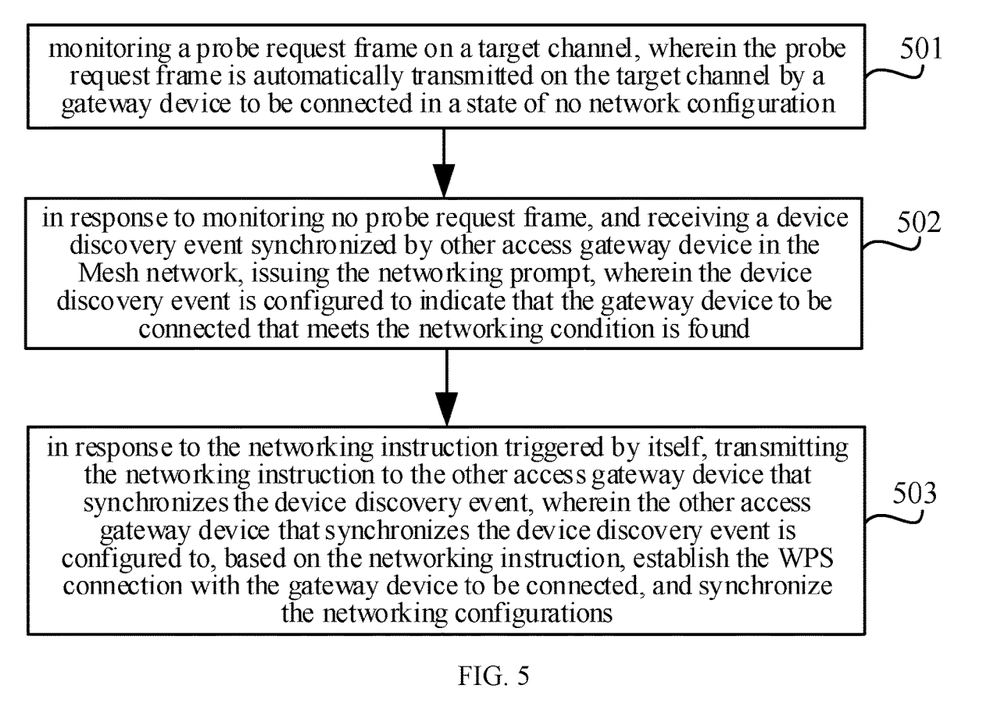
FIG. 5 is a flow chart illustrating transmitting a networking instruction by a connected gateway device that has not monitored a probe request frame to other connected gateway device provided by an exemplary embodiment of the present disclosure.

In a possible implementation, the location of the gateway device to be connected is far away from the connected gateway device, and the connected gateway device triggered by the user has not monitored the probe request frame transmitted by the gateway device to be connected. At this time, the networking prompt may be issued based on the device discovery event synchronized by the other connected gateway device, and the networking instruction may be synchronized to the other connected gateway device, to complete the Mesh networking.

Referring to FIG. 5, which is a flow chart illustrating issuing a networking prompt by a connected gateway device that has not monitored a probe request frame provided by an embodiment of the present disclosure. The method includes the following blocks.

In block 501, a probe request frame is monitored on a target channel, in which the probe request frame is automatically transmitted on the target channel by a gateway device to be connected in a state of no network configuration.

For the implementation of this block, reference may be made to block 203, which is not elaborated in this embodiment.

In block 502, in response to monitoring no probe request frame and receiving a device discovery event synchronized by other connected gateway device in the Mesh network, a networking prompt is issued, in which the device discovery event is configured to indicate that the gateway device to be connected that meets the networking condition is found.

In a possible application scenario, the connected gateway device is far away from the gateway device to be connected, and does not monitor the probe request frame transmitted by the gateway device to be connected in all channels, but receives the device discovery event synchronized by the other connected gateway device in the Mesh network. When the connected gateway device receives the device discovery event synchronized by the other connected gateway device, the connected gateway device confirms that the other connected gateway device has monitored the probe request frame transmitted by the gateway device to be connected, and then issues the networking prompt.

In block 503, in response to the networking instruction triggered by itself, the networking instruction is transmitted to the other connected gateway device that synchronizes the device discovery event, in which the other connected gateway device that synchronizes the device discovery event is configured to, based on the networking instruction, establish the WPS connection with the gateway device to be connected, and synchronize the networking configurations.

When the user finds the networking prompt issued by the connected gateway, the user triggers the Mesh button on the connected gateway device. Since the connected gateway device cannot monitor the probe request frame, that is, cannot perform WPS interaction with the gateway device to be connected, when the connected gateway receives the networking instruction, it synchronizes the networking instruction to the other connected gateway device in the Mesh network.

Further, when the other connected gateway device that has monitored the probe request frame receives the networking instruction synchronized by the connected gateway device, it establishes a connection with the gateway device to be connected through WPS interaction and synchronizes the networking configurations, to complete the Mesh networking.

In this embodiment, when the connected gateway device does not monitor the probe request frame transmitted by the gateway device to be connected, it determines whether the gateway device to be connected meets the networking condition by receiving the device discovery event synchronized by the other connected gateway device, and then issues the networking prompt. Further, the user triggers the connected gateway device to synchronize the networking instruction with the other connected gateway device according to the networking prompt, so that the connected gateway device that has monitored the probe request frame performs Mesh networking with the gateway device to be connected based on the networking instruction.

Figure 6:
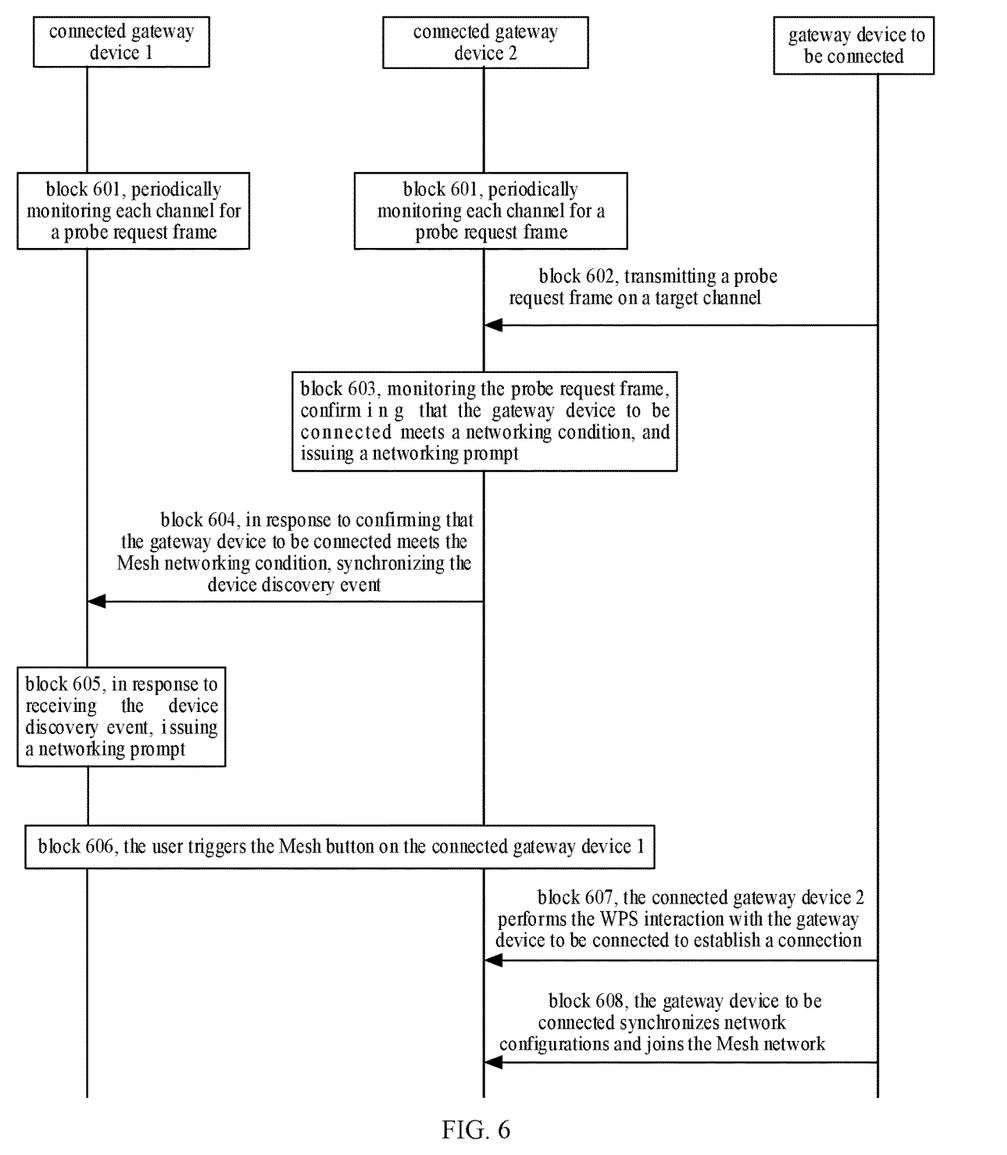
FIG. 6 is a flow chart illustrating a process of Mesh networking of a connected gateway device and a gateway device to be connected provided by an exemplary embodiment of the present disclosure.

Referring to FIG. 6, which is a flow chart illustrating a Mesh networking of a connected gateway and a gateway to be connected provided by an exemplary embodiment of the present disclosure. The process includes the following blocks.

In block 601, each channel is periodically monitored for the probe request frame.

As illustrated in FIG. 6, the connected gateway device 1 and the connected gateway device 2 form the Mesh network, and the connected gateway device 1 and the connected gateway device 2 have the same network configurations. The gateway device to be connected is a new unconfigured gateway device that has not joined the Mesh network.

When the connected gateway device 1 and the connected gateway device 2 are in a normal working state, they periodically monitor each channel for the probe request frame.

In block 602, a probe request frame is transmitted on a target channel.

In a possible application scenario, the gateway device to be connected is far away from the connected gateway device 1 and is close to the connected gateway device 2. When the gateway device to be connected enters the power-on/initialization state, it automatically transmits the probe request frame to the surroundings. Since the gateway device to be connected is far away from the connected gateway device 1, the probe request frame transmitted by the gateway device to be connected can only be monitored by the connected gateway device 2.

In block 603, the probe request frame is monitored to confirm that the gateway device to be connected meets a networking condition, and a networking prompt is issued.

After the connected gateway device 2 monitors the probe request frame, information in the probe request frame, such as the signal strength, the MAC address of the gateway device to be connected, and the device identification, is obtained.

Further, the connected gateway device 2 determines that the gateway device to be connected has the Mesh networking function according to the obtained device identification, and determines that the gateway device to be connected meets the set threshold according to the signal strength of the monitored probe request frame being greater than the set threshold.

In response to the connected gateway device 2 confirming that the gateway device to be connected meets the Mesh networking condition, the networking prompt is issued, in which the networking prompt may be at least one of an indicator prompt, a voice prompt, a vibration prompt, and an image prompt.

In block 604, in response to confirming that the gateway device to be connected meets the Mesh networking condition, a device discovery event is synchronized.

In response to the connected gateway device 2 confirming that the gateway device to be connected meets the networking condition, the connected gateway device 2 synchronizes the device discovery event to the connected gateway device 1. The device discovery event is configured to notify the connected gateway device 1 that the gateway device to be connected that meets the networking condition is found.

In block 605, in response to receiving the device discovery event, the networking prompt is issued.

After the connected gateway device 1 receives the device discovery event synchronized by the connected gateway device 2, the connected gateway device 1 confirms that the gateway device to be connected meets the networking condition, and issues the networking prompt.

In block 606, the user triggers the Mesh button on any connected gateway device.

When the user finds the networking prompt issued by the connected gateway device 1, the user triggers the Mesh button. After the connected gateway device 1 receives the networking instruction, since it cannot directly connect with the gateway device to be connected, it synchronizes the networking instruction to the connected gateway device 2.

In block 607, the connected gateway device 2 performs the WPS interaction with the gateway device to be connected, to establish a connection.

After the connected gateway device 2 receives the networking instruction synchronized by the connected gateway device 1, the connected gateway device 2 performs the WPS interaction with the gateway device to be connected to establish the connection.

In block 608, the gateway device to be connected synchronizes the network configurations and joins the Mesh network.

Through the established WPS connection, the connected gateway device 2 synchronizes the networking configurations of the Mesh network to the gateway device to be connected, and the gateway device to be connected joins the Mesh network based on the networking configurations.

Referring to FIG. 7, which illustrates an apparatus for Mesh networking provided by an exemplary embodiment of the present disclosure. The apparatus is applied to a connected gateway device in the Mesh network, and includes a monitoring module 701, a connecting module 702 and a configuration synchronization module 703.

The monitoring module 701 is configured to monitor a probe request frame on a target channel, wherein the probe request frame is automatically transmitted on the target channel by a gateway device to be connected in a state of no network configuration.

The connecting module 702 is configured to establish a Wi-Fi protected setup (WPS) connection with the gateway device to be connected, in response to the monitored probe request frame indicating that the gateway device to be connected meets a networking condition and receiving a networking instruction.

The configuration synchronization module 703 is configured to synchronize networking configurations to the gateway device to be connected through the WPS connection, so that the gateway device to be connected is connected to the Mesh network based on the networking configurations.

Optionally, the connecting module 702 includes a first connecting sub-module or a second connecting sub-module.

The first connecting sub-module is configured to establish the WPS connection with the gateway device to be connected, in response to the monitored probe request frame indicating that the gateway device to be connected meets the networking condition and receiving the networking instruction triggered by itself, wherein the networking instruction is triggered by a button on the connected gateway device.

The second connecting sub-module is configured to establish the WPS connection with the gateway device to be connected, in response to the monitored probe request frame indicating that the gateway device to be connected meets the networking condition and receiving the networking instruction transmitted by a target connected gateway device in the Mesh network, wherein the networking instruction is triggered by a button on the target connected gateway device.

Optionally, the networking instruction is transmitted by the target connected gateway device, and the target connected gateway device has not monitored the probe request frame.

Optionally, the apparatus further includes a synchronization module. The synchronization module is configured to synchronize a first device discovery event to other connected gateway device in the Mesh network, in response to the monitored probe request frame indicating that the gateway device to be connected meets the networking condition, wherein the first device discovery event is configured to indicate that the gateway device to be connected that meets the networking condition has been found.

The target connected gateway device is configured to issue a networking prompt after receiving the first device discovery event, and to transmit the networking instruction to other connected gateway devices in the Mesh network when the networking instruction is triggered.

Optionally, the first device discovery event includes a first signal strength of the monitored probe request frame.

Optionally, the apparatus further includes a receiving module. The receiving module is configured to receive a second device discovery event synchronized by other connected gateway device in the Mesh network, wherein the second device discovery event comprises a second signal strength of the probe request frame monitored by the other connected gateway device.

Optionally, the second connecting sub-module is further configured to: in response to the monitored probe request frame indicating that the gateway device to be connected meets the networking condition and receiving the networking instruction transmitted by the target connected gateway device in the Mesh network, obtain the first signal strength and the second signal strength; and in response to the first signal strength being greater than the second signal strength, establish the WPS connection with the gateway device to be connected.

Optionally, the apparatus further includes an obtaining module and a determining module. The obtaining module is configured to obtain a device identification contained in the probe request frame, in response to the monitored probe request frame. The determining module is configured to determine that the gateway device to be connected meets the networking condition, in response to the device identification belonging to a device identification set, wherein the device identification set comprises identifications of devices supporting an access to the Mesh network.

Optionally, the determining module is further configured to determine that the gateway device to be connected meets the networking condition, in response to the device identification belonging to the device identification set, and the first signal strength of the monitored probe request frame being greater than a signal strength threshold.

Optionally, the apparatus further includes a first prompt module. The first prompt module is configured to issue a networking prompt, in response to the monitored probe request frame indicating that the gateway device to be connected meets the networking condition, wherein the networking prompt comprises at least one of an indicator light prompt, a voice prompt, a vibration prompt, and an image prompt.

Optionally, the apparatus further includes a second prompt module and a transmitting module. The second prompt module is configured to issue a networking prompt, in response to monitoring no probe request frame, and receiving a device discovery event synchronized by other connected gateway device in the Mesh network, wherein the device discovery event is configured to indicate that the gateway device to be connected that meets the networking condition has been found. The transmitting module is configured to transmit the networking instruction to the other connected gateway device that synchronizes the device discovery event, in response to the networking instruction triggered by itself, wherein the other connected gateway device that synchronizes the device discovery event is configured to establish the WPS connection with the gateway device to be connected based on the networking instruction, and synchronize the networking configurations.

FIG. 8 is a block diagram illustrating a gateway device provided by an exemplary embodiment of the present disclosure. The gateway device 800 generally includes one or a plurality of the following components: processor 810 and memory 820.

The processor 810 may include one or a plurality of processing cores. The processor 810 uses various interfaces and lines to connect various parts of the entire gateway device 800. By running or executing instructions, programs, code sets, or instruction sets stored in the memory 820, and calling data stored in the memory 820, various functions of the gateway device 800 can be executed and data of the gateway device 800 can be processed. Optionally, the processor 810 may be realized by at least one of hardware forms, such as digital signal processing (DSP), field-programmable gate array (FPGA), and programmable logic array (PLA). The processor 810 can integrate one or a combination of a central processing unit (CPU), a graphics processing unit (GPU), a neural-network processor unit (NPU), a modem, and the like. The CPU mainly processes operating systems, user interfaces, and application programs; the GPU is used to render and draw the content that needs to be displayed on the touch screen 850; the NPU is used to implement artificial intelligence (AI) functions; and the modem is used to process wireless communication. It could be understood that the above modem may not be integrated into the processor 810, but may be implemented by a chip alone.

The memory 820 may include random access memory (RAM), or may include read-only memory (ROM). Optionally, the memory 820 includes a non-transitory computer-readable storage medium. The memory 820 may be used to store instructions, programs, codes, code sets or instruction sets. The memory 820 may include a program storage area and a data storage area, in which the program storage area may store instructions for implementing the operating system, instructions used for at least one function (such as touch function, sound playback function, image playback function, and the like), instructions for implementing the following various method embodiments, and the like; the data storage area can store data (such as audio data, and media data) downloaded according to the use of the gateway device 800, and the like.

In embodiments of the present disclosure, the gateway device 800 further includes a Wi-Fi component 830 for transmitting and receiving probe request frames. The gateway device 800 may be connected to the Internet through the Wi-Fi component 830 to obtain network resources, and the gateway device 800 may also synchronize the device discovery event and the networking instruction to other connected gateway devices in the same Mesh network by Wi-Fi component 830.

In embodiments of the present disclosure, the gateway device 800 may further include a prompt component 840 for issuing the networking prompt, in which the prompt component 840 may include at least one of an indicator light, a buzzer, and a speaker. The indicator light may be a light-emitting diode installed on the top of or around the gateway device 800, which is used to convert the electrical signal from the processor 810 into an optical signal. The indicator light flashes or keeps on to prompt to the user. The buzzer may be a piezo buzzer or an electromagnetic buzzer, which is used to convert the electric signal from the processor 810 into a sound signal. The buzzer buzzes to prompt the user. The speaker may be a traditional film speaker or a piezoelectric ceramic speaker. The speaker may receive the electrical signal of the processor 810, and play the music to issue the networking prompt to the user. When the speaker is a piezoelectric ceramic speaker, it can not only convert electrical signals into sound waves that are audible to humans, but also convert electrical signals into sound waves that are inaudible to humans for distance measurement and other purposes. Those skilled in the art can understand that the structure illustrated in FIG. 8 is not a limit on the gateway device 800, and may include more or less components than illustrated in the drawing, or combine certain components, or adopt different component arrangements.

A computer-readable storage medium is provided in the present disclosure, in which at least one instruction is stored in the storage medium, and at least one instruction is loaded and executed by a processor to implement the method for Mesh networking provided by the method embodiments.

A computer program product or a computer program is provided in the present disclosure, in which the computer program product or the computer program includes computer instructions stored on a computer-readable storage medium. The processor of the gateway device reads the computer instructions from the computer-readable storage medium, and the processor executes the computer instructions, so that the computer device implements the method for Mesh networking of any one the embodiments.

The serial numbers of the embodiments of the present disclosure are only for description, and do not represent the superiority or inferiority of the embodiments.

Those skilled in the art can understand that all or part of the blocks in the embodiments can be implemented by hardware, or be implemented by a program instructing relevant hardware. The program can be stored in a computer-readable storage medium, in which the storage medium can be a read-only memory, a magnetic disk, an optical disk, and the like.

The above are only optional embodiments of the present disclosure and are not intended to limit the present disclosure. Any modification, equivalent replacement and improvement made within the spirit and principle of the disclosure shall be included in the protection scope of this disclosure.

What is claimed is:

1. A method for Mesh networking, applied to a gateway device connected to a Mesh network, comprising:
   monitoring a probe request frame on a target channel, wherein the probe request frame is automatically transmitted on the target channel by a gateway device to be connected in a state of no network configuration;
   in response to a monitored probe request frame indicating that the gateway device to be connected meets a networking condition and receiving a networking instruction, establishing a Wi-Fi Protected Setup (WPS) connection with the gateway device to be connected; and
   synchronizing networking configurations to the gateway device to be connected through the WPS connection, so that the gateway device to be connected is connected to the Mesh network based on the networking configurations;
   the method further comprising:
   in response to monitoring no probe request frame, and receiving a device discovery event synchronized by other connected gateway device in the Mesh network, issuing a networking prompt, wherein the device discovery event is configured to indicate that the gateway device to be connected that meets the networking condition has been found; and
   in response to the networking instruction triggered by itself, transmitting the networking instruction to the other connected gateway device that synchronizes the device discovery event, wherein the other connected gateway device that synchronizes the device discovery event is configured to establish the WPS connection with the gateway device to be connected based on the networking instruction, and synchronize the networking configurations.

2. The method of claim 1, wherein in response to a monitored probe request frame indicating that the gateway device to be connected meets a networking condition and receiving a networking instruction, establishing a Wi-Fi Protected Setup (WPS) connection with the gateway device to be connected, comprises:
   in response to the monitored probe request frame indicating that the gateway device to be connected meets the networking condition and receiving the networking instruction triggered by itself, establishing the WPS connection with the gateway device to be connected, wherein the networking instruction is triggered by a button on the connected gateway device;
   or,
   in response to the monitored probe request frame indicating that the gateway device to be connected meets the networking condition and receiving the networking instruction transmitted by a target connected gateway device in the Mesh network, establishing the WPS connection with the gateway device to be connected, wherein the networking instruction is triggered by a button on the target connected gateway device.

3. The method of claim 2, wherein the networking instruction is transmitted by the target connected gateway device, and the target connected gateway device has not monitored the probe request frame; wherein after monitoring the probe request frame on the target channel, the method further comprises:
   in response to the monitored probe request frame indicating that the gateway device to be connected meets the networking condition, synchronizing a first device discovery event to other connected gateway device in the Mesh network, wherein the first device discovery event is configured to indicate that the gateway device to be connected that meets the networking condition has been found;
   wherein, the target connected gateway device is configured to issue a networking prompt after receiving the first device discovery event, and to transmit the networking instruction to the other connected gateway device in the Mesh network when the networking instruction is triggered.

4. The method of claim 3, wherein the first device discovery event comprises a first signal strength of the monitored probe request frame;
   the method further comprises:
   receiving a second device discovery event synchronized by other connected gateway device in the Mesh network, wherein the second device discovery event comprises a second signal strength of the probe request frame monitored by the other connected gateway device;
   in response to the monitored probe request frame indicating that the gateway device to be connected meets the networking condition and receiving the networking instruction transmitted by the target connected gateway device in the Mesh network, establishing the WPS connection with the gateway device to be connected comprises:
   in response to the monitored probe request frame indicating that the gateway device to be connected meets the networking condition and receiving the networking instruction transmitted by the target connected gateway device in the Mesh network, obtaining the first signal strength and the second signal strength; and
   in response to the first signal strength being greater than the second signal strength, establishing the WPS connection with the gateway device to be connected.

5. The method of claim 1, further comprising:
   in response to the monitored probe request frame, obtaining a device identification contained in the probe request frame; and
   in response to the device identification belonging to a device identification set, determining that the gateway device to be connected meets the networking condition, wherein the device identification set comprises identifications of devices supporting an access to the Mesh network.

6. The method of claim 5, wherein in response to the device identification belonging to the device identification set, determining that the gateway device to be connected meets the networking condition comprises:
in response to the device identification belonging to the device identification set, and the first signal strength of the monitored probe request frame being greater than a signal strength threshold, determining that the gateway device to be connected meets the networking condition.

7. The method of claim 1, further comprising:
in response to the monitored probe request frame indicating that the gateway device to be connected meets the networking condition, issuing a networking prompt, wherein the networking prompt comprises at least one of an indicator light prompt, a voice prompt, a vibration prompt, and an image prompt.

8. An apparatus for Mesh networking, applied to a gateway device connected to a Mesh network, comprising:
a processor; and
a memory, configured to store instructions executable by the processor,
wherein the processor is configured to execute the instructions stored in the memory, so as to:
monitor a probe request frame on a target channel, wherein the probe request frame is automatically transmitted on the target channel by a gateway device to be connected in a state of no network configuration;
establish a Wi-Fi protected setup (WPS) connection with the gateway device to be connected, in response to the monitored probe request frame indicating that the gateway device to be connected meets a networking condition and receiving a networking instruction; and
synchronize networking configurations to the gateway device to be connected through the WPS connection, so that the gateway device to be connected is connected to the Mesh network based on the networking configurations;
wherein the processor is further configured to:
issue a networking prompt, in response to monitoring no probe request frame, and receiving a device discovery event synchronized by other connected gateway device in the Mesh network, wherein the device discovery event is configured to indicate that the gateway device to be connected that meets the networking condition has been found; and
transmit the networking instruction to the other connected gateway device that synchronizes the device discovery event, in response to the networking instruction triggered by itself, wherein the other connected gateway device that synchronizes the device discovery event is configured to establish the WPS connection with the gateway device to be connected based on the networking instruction, and synchronize the networking configurations.

9. The apparatus of claim 8, wherein the processor is configured to:
establish the WPS connection with the gateway device to be connected, in response to the monitored probe request frame indicating that the gateway device to be connected meets the networking condition and receiving the networking instruction triggered by itself, wherein the networking instruction is triggered by a button on the connected gateway device;
or,
establish the WPS connection with the gateway device to be connected, in response to the monitored probe request frame indicating that the gateway device to be connected meets the networking condition and receiving the networking instruction transmitted by a target connected gateway device in the Mesh network, wherein the networking instruction is triggered by a button on the target connected gateway device.

10. The apparatus of claim 9, wherein the networking instruction is transmitted by the target connected gateway device, and the target connected gateway device has not monitored the probe request frame;
the processor is further configured to:
synchronize a first device discovery event to other connected gateway device in the Mesh network, in response to the monitored probe request frame indicating that the gateway device to be connected meets the networking condition, wherein the first device discovery event is configured to indicate that the gateway device to be connected that meets the networking condition has been found;
wherein, the target connected gateway device is configured to issue a networking prompt after receiving the first device discovery event, and to transmit the networking instruction to other connected gateway devices in the Mesh network when the networking instruction is triggered.

11. The apparatus of claim 10, wherein the first device discovery event comprises a first signal strength of the monitored probe request frame;
the processor is further configured to:
receive a second device discovery event synchronized by other connected gateway device in the Mesh network, wherein the second device discovery event comprises a second signal strength of the probe request frame monitored by the other connected gateway device;
in response to the monitored probe request frame indicating that the gateway device to be connected meets the networking condition and receiving the networking instruction transmitted by the target connected gateway device in the Mesh network, obtain the first signal strength and the second signal strength; and
in response to the first signal strength being greater than the second signal strength, establish the WPS connection with the gateway device to be connected.

12. The apparatus of claim 8, wherein the processor is further configured to:
obtain a device identification contained in the probe request frame, in response to the monitored probe request frame; and
determine that the gateway device to be connected meets the networking condition, in response to the device identification belonging to a device identification set, wherein the device identification set comprises identifications of devices supporting an access to the Mesh network.

13. The apparatus of claim 12, wherein the processor is further configured to:
determine that the gateway device to be connected meets the networking condition, in response to the device identification belonging to the device identification set, and the first signal strength of the monitored probe request frame being greater than a signal strength threshold.

14. The apparatus of claim 8, wherein the processor is further configured to:
issue a networking prompt, in response to the monitored probe request frame indicating that the gateway device to be connected meets the networking condition, wherein the networking prompt comprises at least one of an indicator light prompt, a voice prompt, a vibration prompt, and an image prompt.

15. A gateway device, comprising:
a Wi-Fi component, configured to transmit and receive probe request frames;
a processor;
a memory, configured to store instructions executable by the processor;
a prompt component, configured to issue a networking prompt; and
a button, configured to receive a networking instruction from a user in response to the networking prompt,
wherein the processor is configured to:
control the prompt component to issue the networking prompt in response to a received probe request frame indicating that a gateway device to be connected meets a networking condition;
receive the networking instruction from the button;
establish a Wi-Fi protected setup (WPS) connection with the gateway device to be connected in response to the networking instruction; and
synchronize networking configurations to the gateway device to be connected through the WPS connection, so that the gateway device to be connected is connected to the Mesh network based on the networking configurations;
wherein the processor is further configured to:
issue a networking prompt, in response to monitoring no probe request frame, and receiving a device discovery event synchronized by other connected gateway device in the Mesh network, wherein the device discovery event is configured to indicate that the gateway device to be connected that meets the networking condition has been found; and
transmit the networking instruction to the other connected gateway device that synchronizes the device discovery event, in response to the networking instruction triggered by itself, wherein the other connected gateway device that synchronizes the device discovery event is configured to establish the WPS connection with the gateway device to be connected based on the networking instruction, and synchronize the networking configurations.

16. The gateway device of claim 15, wherein the prompt component comprises at least one member selected from the group consisting of an indicator light, a buzzer, and a speaker.

* * * * *